(12) United States Patent
Fedewa

(10) Patent No.: US 8,467,923 B2
(45) Date of Patent: Jun. 18, 2013

(54) VEHICLE DECELERATION RATE CONTROL DURING DECELERATION FUEL CUTOFF BY VARYING GENERATION ELECTRIC LOAD

(75) Inventor: Andrew Fedewa, Clarkston, MI (US)

(73) Assignee: Delphi Technologies, Inc., Troy, MI (US)

( * ) Notice: Subject to any disclaimer, the term of this patent is extended or adjusted under 35 U.S.C. 154(b) by 399 days.

(21) Appl. No.: 12/949,864

(22) Filed: Nov. 19, 2010

(65) Prior Publication Data
US 2012/0130572 A1   May 24, 2012

(51) Int. Cl.
*B60W 10/08*   (2006.01)

(52) U.S. Cl.
USPC .. 701/22; 180/65.1; 180/65.265; 123/198 DB

(58) Field of Classification Search
USPC ............... 701/22, 54, 95, 84–87, 101, 108, 701/70, 110, 112; 180/65.1, 65.265, 65–25, 180/65.27–65.29, 65.225, 65.285, 170, 179; 123/198 DB, 198 F, 90.16; 903/930, 905, 903/945, 917–919, 947; 477/107, 110, 111, 477/115, 118, 127; 60/698; 303/152
See application file for complete search history.

(56) References Cited

U.S. PATENT DOCUMENTS

| | | | |
|---|---|---|---|
| 6,132,015 A | 10/2000 | Aoyama | |
| 6,988,779 B2 | 1/2006 | Amanuma et al. | |
| 2002/0112902 A1 | 8/2002 | Wakashiro et al. | |
| 2002/0115532 A1 | 8/2002 | Wakashiro et al. | |
| 2005/0125134 A1* | 6/2005 | Iwatsuki et al. | 701/70 |
| 2006/0131085 A1 | 6/2006 | Tamai | |
| 2006/0272863 A1 | 12/2006 | Donahue | |
| 2007/0293368 A1* | 12/2007 | Tamai et al. | 477/107 |
| 2009/0030585 A1 | 1/2009 | Aldrich, III et al. | |
| 2010/0036574 A1 | 2/2010 | Hopp | |

FOREIGN PATENT DOCUMENTS

| | | |
|---|---|---|
| GB | 11375 | 0/1913 |

* cited by examiner

*Primary Examiner* — Marthe Marc-Coleman
(74) *Attorney, Agent, or Firm* — Lawrence D. Hazelton

(57) ABSTRACT

A vehicle control system for controlling a vehicle deceleration rate that includes a dynamo (e.g. generator/motor) coupled to the vehicle to provide a dynamo deceleration force to the vehicle corresponding to an electric load, an internal combustion engine coupled the vehicle to provide an engine deceleration force to the vehicle corresponding to a throttle position, and a controller coupled to the internal combustion engine and the dynamo. The controller is configured determine a deceleration fuel cutoff (DFCO) request based on an accelerator pedal position, and when a DFCO request is determined increase the throttle position to decrease the engine deceleration force, and increase the electric load on the dynamo to increase the dynamo deceleration force, to control the vehicle deceleration rate.

16 Claims, 2 Drawing Sheets

VEHICLE DECELERATION RATE CONTROL DURING DECELERATION FUEL CUTOFF BY VARYING GENERATION ELECTRIC LOAD

TECHNICAL FIELD OF INVENTION

The invention generally relates to vehicle deceleration rate control during a deceleration fuel cutoff request, and more particularly relates to decreasing deceleration from engine braking by increasing throttle position and increasing deceleration by increasing an electric load on a dynamo (e.g.—a generator).

BACKGROUND OF INVENTION

It is known to use a dynamo (e.g. an electric motor/generator) to decelerate a vehicle by way of regenerative braking. The electrical energy produced during regenerative braking is typically dumped into (i.e.—absorbed by) the vehicle's rechargeable battery by the battery charging system. However the charging voltage of charging system is generally fixed, and so the amount of deceleration provided by regenerative braking may not be sufficient to slow the vehicle at the desired deceleration rate. Also, when a vehicle is decelerating, for example coasting, some of the deceleration force comes from engine pumping losses. However, if it is desired to maximize the amount of electrical energy produced during regenerative braking, then is desirable to minimize the engine pumping losses.

SUMMARY OF THE INVENTION

In general, a system, a controller, and a method are provided to control various aspects of a decelerating vehicle to minimize the loss of kinetic energy and maximize the amount of energy recovered by regenerative braking, and so increase the operating efficiency of the vehicle.

In accordance with one embodiment of this invention, a vehicle control system for controlling a vehicle deceleration rate is provided. The system includes a dynamo, an internal combustion engine and a controller. The dynamo is configured output electricity in accordance with an electric load on the dynamo. The dynamo is also coupled to the vehicle in a manner effective to provide a dynamo deceleration force to the vehicle corresponding to the electric load. The internal combustion engine is coupled to the dynamo to rotate the dynamo and thereby output electricity. The internal combustion engine is also coupled to the vehicle in a manner effective to provide an engine deceleration force to the vehicle corresponding to a throttle position. The controller is coupled to the internal combustion engine and coupled to the dynamo. The controller is configured to determine a deceleration fuel cutoff (DFCO) request based on an accelerator pedal position. When a DFCO request is determined, the throttle position is increased to decrease the engine deceleration force. Also, the electric load on the dynamo is increased to increase the dynamo deceleration force. By this, the vehicle deceleration rate is controlled.

In another embodiment of the present invention, a controller for a vehicle control system configured to control a vehicle deceleration rate is provided. The controller is coupled to a dynamo configured output electricity in accordance with an electric load on the dynamo. The dynamo also coupled to the vehicle in a manner effective to provide a dynamo deceleration force to the vehicle corresponding to the electric load. The controller is also coupled to an internal combustion engine coupled to the dynamo to rotate the dynamo and thereby output electricity. The internal combustion engine is also coupled to the vehicle in a manner effective to provide an engine deceleration force to the vehicle corresponding to a throttle position. The controller includes an accelerator pedal position input, a processor, a throttle control output, and a dynamo. The accelerator pedal position input for receiving an indication of an accelerator pedal position. The processor determines a deceleration fuel cutoff (DFCO) request based on the accelerator pedal position. The throttle control output is configured to increase the throttle position to decrease the engine deceleration force when a DFCO request is determined. The dynamo control output is configured to increase the electric load on the dynamo to increase the dynamo deceleration force when a DFCO request is determined. By this, the vehicle deceleration rate is controlled.

In yet another embodiment of the present invention, a method for controlling a vehicle deceleration rate of a vehicle is provided. The method includes the step of equipping the vehicle with a dynamo configured output electricity in accordance with an electric load on the dynamo. The dynamo is also coupled to the vehicle in a manner effective to provide a dynamo deceleration force to the vehicle corresponding to the electric load. The method also includes the step of equipping the vehicle with an internal combustion engine coupled to the dynamo to rotate the dynamo and thereby output electricity. The internal combustion engine is also coupled to the vehicle in a manner effective to provide an engine deceleration force to the vehicle corresponding to a throttle position. The method also includes the step of determining that a deceleration fuel cutoff (DFCO) request based on an accelerator pedal position. When a DFCO request is determined, the method controls the vehicle deceleration rate by increasing the throttle position to decrease the engine deceleration force, and increasing the electric load on the dynamo to increase the dynamo deceleration force.

Further features and advantages of the invention will appear more clearly on a reading of the following detailed description of the preferred embodiment of the invention, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION OF INVENTION

Figure 1:
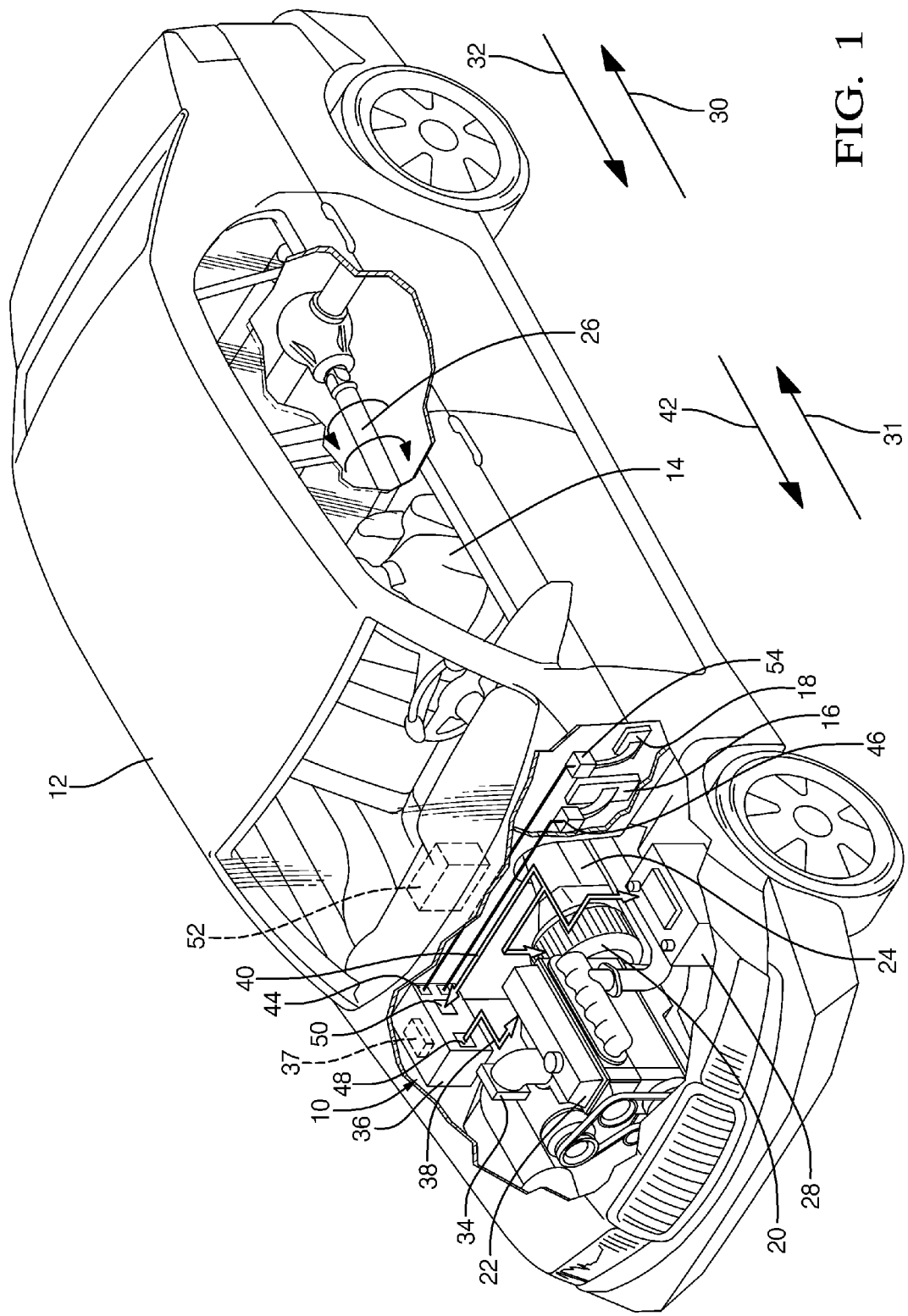
FIG. 1 is a perspective cut-away view of a vehicle equipped with at vehicle control system in accordance with one embodiment.

In accordance with an embodiment, FIG. 1 illustrates a vehicle control system 10, hereafter system 10, for controlling a vehicle deceleration rate of a vehicle 12. A vehicle deceleration rate may be called for in response to a vehicle operator 14 releasing an accelerator pedal 16, and/or applying pressure to a brake pedal 18 to reduce vehicle speed. Alternatively, a vehicle deceleration rate may also be called for by a vehicle speed control system (not shown), commonly known as a cruise control system. A cruise control system may call for a vehicle deceleration rate, for example, in response to the vehicle operator changing a desired cruising speed, or in response to the vehicle speed control system detecting an object in front of the vehicle, such as another vehicle (not shown).

The system 10 may include a dynamo 20. As used herein, a dynamo is any electro-mechanical device that can generate electrical energy in response to mechanical energy being provided to the dynamo, for example, as occurs by rotating a pulley shaft of a generator or alternator. Furthermore, a dynamo may also generate mechanical energy in response to electrical energy being provided to the dynamo, for example, as does an electric motor. It is well known that various types of dynamos can operate in both modes, that is, as a generator and/or as a motor. FIG. 1 illustrates a known, non-limiting example of a dynamo 20 located between an internal combustion engine 22 and a transmission 24, an arrangement found in some vehicles marketed as hybrid vehicles. It is known that for such an arrangement, the dynamo 20 can be operated as a motor to either start the engine 20 or rotate a drive shaft 26 to propel or accelerate the vehicle 12. Furthermore, such a dynamo 20 can be operated as a generator to provide electrical energy to the vehicle 10 for recharging a rechargeable battery 28 or operating other electric devices on the vehicle. The mechanical energy consumed to provide electrical energy may also be employed to decelerate the vehicle 12 in a practice commonly known as regenerative braking. As such, it understood that the dynamo 20 may be configured and operated to output electricity in accordance with the electricity demands of an electric load on the dynamo 20. Furthermore, it will be appreciated that the dynamo 20 may also be coupled to the vehicle 12 in a manner effective to provide a dynamo deceleration force to the vehicle 12 corresponding to the electric load. The dynamo deceleration force is illustrated as an arrow 30, hereafter the dynamo deceleration force 30. Likewise, it will be appreciated that the dynamo 20 may also be coupled to the vehicle 12 in a manner effective to provide a dynamo acceleration force to the vehicle 12 corresponding to the amount of electric power available to or consumed by the dynamo 20. The dynamo acceleration force is illustrated as an arrow 31, hereafter the dynamo deceleration force 31. It will be recognized that the dynamo 20 could be located elsewhere, for example as a belt driven generator or alternator, as is generally found in non-hybrid vehicles.

Continuing to refer to FIG. 1, the system 10 may also include an internal combustion engine 22, hereafter the engine 22. The engine 22 may be a spark ignition type, fueled with, for example, gasoline. Alternatively, the engine 22 may be a compression ignition type engine fueled with, for example, diesel fuel, bio-fuel, or gasoline. The engine 22 is generally coupled to the dynamo 20 to rotate the dynamo 20 for outputting electricity as described above when the dynamo 20 operates as a generator. The internal combustion engine 22 is also generally coupled to the vehicle 10 in a manner effective to provide an engine deceleration force to the vehicle 12 corresponding to a throttle position of an air throttle valve 34 on the engine 22. The engine deceleration force is illustrated as an arrow 32, hereafter the engine deceleration force 32. As used herein, the air throttle valve 34, hereafter throttle 34, is generally an air control throttle valve that is typically found on gasoline spark ignition engines for controlling engine power output. Alternatively, the valve 34 may a fresh air restrictor valve that is typically found on diesel compression ignition engines for controlling or regulating exhaust gas recirculation rates.

The system 10 may also include a controller 36 coupled to the internal combustion engine 22 by way of, for example, one or more wires 38. Also, the controller 36 may be coupled to the dynamo 20 by way of, for example, one or more wires 40. It will be recognized that some of the wires 38 and/or 40 could be replaced by optical fiber, or part of the connection could be part of a communications buss, possibly wireless. The controller 36 may include a processor (37) such as a microprocessor or other control circuitry as should be evident to those in the art. The controller 36 may include memory, including non-volatile memory, such as electrically erasable programmable read-only memory (EEPROM) for storing one or more routines, thresholds and captured data. The one or more routines may be executed by the processor 37 to perform steps for determining if signals received by the controller 36 are such a deceleration fuel cutoff (DFCO) has been requested based on an accelerator pedal position of the accelerator pedal 16 and or a brake pedal position of the brake pedal 18. As used herein, a DFCO request is a condition that may occur when the vehicle is coasting or decelerating, such as when the operator 14 releases the accelerator pedal 16 and or applies pressure to the brake pedal 18. In general, when a DFCO request is determined, fuel is not delivered to the engine 22 and so the engine does not provide or output any engine acceleration force. The engine acceleration force is illustrated as an arrow 42, hereafter the engine acceleration force 42. Furthermore, without fuel, pumping losses occurring within the engine 22 will produce an engine deceleration force 32 if the engine remains coupled to the vehicle 12 via the transmission 24. In some instances it may be desirable to minimize engine pumping losses so that more of the kinetic energy of the vehicle can be recovered by regenerative braking. As such, it may be desirable to increase the throttle position of the throttle 34 to decrease the engine deceleration force 32 caused by pumping losses of the engine 22. It should be understood that only increasing the throttle position will reduce the deceleration rate of the vehicle. Accordingly, it may also be desirable to correspondingly increase an electric load on the dynamo 20 to increase the dynamo deceleration force 30 to increase the vehicle deceleration rate. It will be appreciated that by varying the electric load on the dynamo that the deceleration rate of the vehicle can be controlled. Various ways to increase the electric load on the dynamo 20 will be explained in more detail below.

Determining by the controller 36 that DFCO is requested may be enabled by the controller 36 having an accelerator pedal position input 44 for receiving an indication of an accelerator pedal position of the accelerator pedal 16. By way of example and not limitation, the accelerator pedal 16 may be equipped with a potentiometer 46 in a manner that is well known, and the indication of accelerator pedal position may be communicated to the controller 36 via a wire as illustrated. Also, the controller 26 may be equipped with a throttle control output that may be part of a general engine control input/output 48 configured to increase the throttle position to decrease the engine deceleration force when a DFCO request is determined. Ways for the controller 36 to increase throttle position are well known in the throttle-by-wire arts. The controller 36 may also include a dynamo control output as part of a general dynamo control input/output 50, the details of which are generally known in the vehicle voltage regulation arts. The controller 36 may also be configured to increase the electric load on the dynamo to increase the dynamo deceleration force when a DFCO request is determined, as will be explained in more detail below.

Ways to vary the electric load on the dynamo 20 will now be explained. One embodiment of the system 10 may include a rechargeable battery 28, for example a lead-acid type battery, or a lithium-ion type battery. It is noted that specific electrical connections to the batter 28 are not shown in FIG. 1, and that a variety of connection means are well known. By way of a non-limiting example, one terminal of the battery 28 may be electrically coupled to the engine 22 by a ground strap, and the other terminal may be coupled to a voltage regulator (not show) that receives electrical energy from the dynamo 20. The electric load on the dynamo 22 may be increased by increasing a charging voltage output by the dynamo 22. It will be recognized that a long term increase of the charging voltage may damage the rechargeable battery 28. However, it has been learned that short term increases, such as during vehicle decelerations will not cause substantial damage to the rechargeable battery 28. By way of example and not limitation, the charging voltage may be increased by 10% above the recommended charging voltage for the rechargeable battery 28 for 1 minute with out causing substantial damage to the rechargeable battery 28.

In another embodiment of the system 10, another way to vary the electrical load on the dynamo 22 is described. The controller may be configured to control charging of the rechargeable battery 28 to a state of charge that is less than fully charged by an amount corresponding to the amount of charge typically produced when the vehicle is decelerated using regenerative braking. For such an embodiment, the processor may also include a known routine to monitor or estimate the state of charge of the rechargeable battery 28, and estimate the amount of electrical energy that may be produced by decelerating or stopping the vehicle 12. Such and estimate may be based on the speed of the vehicle 12, the weight of the vehicle 12, and on electrical characteristics of the dynamo 22. The estimate may otherwise be based on empirical data taken during development testing, which may stored in the form of look-up tables or formulas in the processor 37. By way of example and not limitation, if the rechargeable battery 28 is determined to be fully charged, or at the state of charge is greater than desired, the rechargeable battery may be discharged by using electricity taken from the battery 29 to propel the vehicle using the dynamo 22 as a motor to provide a dynamo acceleration force 31.

In still another embodiment of the system 10, another way to vary the electrical load on the dynamo 22 is described. The system may also include an electric device 52 coupled to the dynamo 22. The electric device 52 is generally characterized as some device that consumes electricity when is activated. By way of example and not limitation, the electric device may be a heating element for heating the vehicle interior, or an electric air-conditioning compressor for cooling the vehicle interior, or a known electro-thermal device capable of heating and cooling based on the polarity of electricity applied to the electro-thermal device. Otherwise the electric device 52 may be a secondary electricity storage device such as a second battery or a large valued capacitor, commonly known as an ultra-capacitor. What ever is selected as the electric device 52, it will be appreciated that the electric load on the dynamo 22 can be increased by activating the electric device 52. It will also be recognized that the electric device 52 may include more than one of the examples given above, or other devices typically found on a vehicle 10.

In another embodiment, the system 10, or vehicle 12, may include a friction brake system (not shown) that is activated by the operator 14 pressing on the brake pedal 18. Such a brake system is well known and is used for stopping virtually all automobiles on the road today. The friction brake system may be independent from the controller 36, or may be integral to the controller 36, for example a brake-by-wire type braking. In this embodiment, the controller 36 may be configured to detect a brake pedal position indicative of a desired deceleration rate. By way of example and not limitation, the brake pedal 18 may be equipped with a brake pedal pressure sensor 54 in a manner that is well known, and the indication of brake pedal pressure may be communicated to the controller 36 via a wire as illustrated. The controller 36 may also be configured to reduce a friction braking force of the friction brake system. Reducing the friction braking force may be accomplished in the same manner as friction brakes are released by an anti-lock braking system when brake lockup is detected. If the friction braking force is reduced, then it may be desirable to correspondingly increase the dynamo deceleration force 30 by one or more of the ways described above to vary the electric load on the dynamo 22, and so control the vehicle deceleration rate to the desired deceleration rate indicated by the brake pedal pressure sensor 54.

Figure 2:
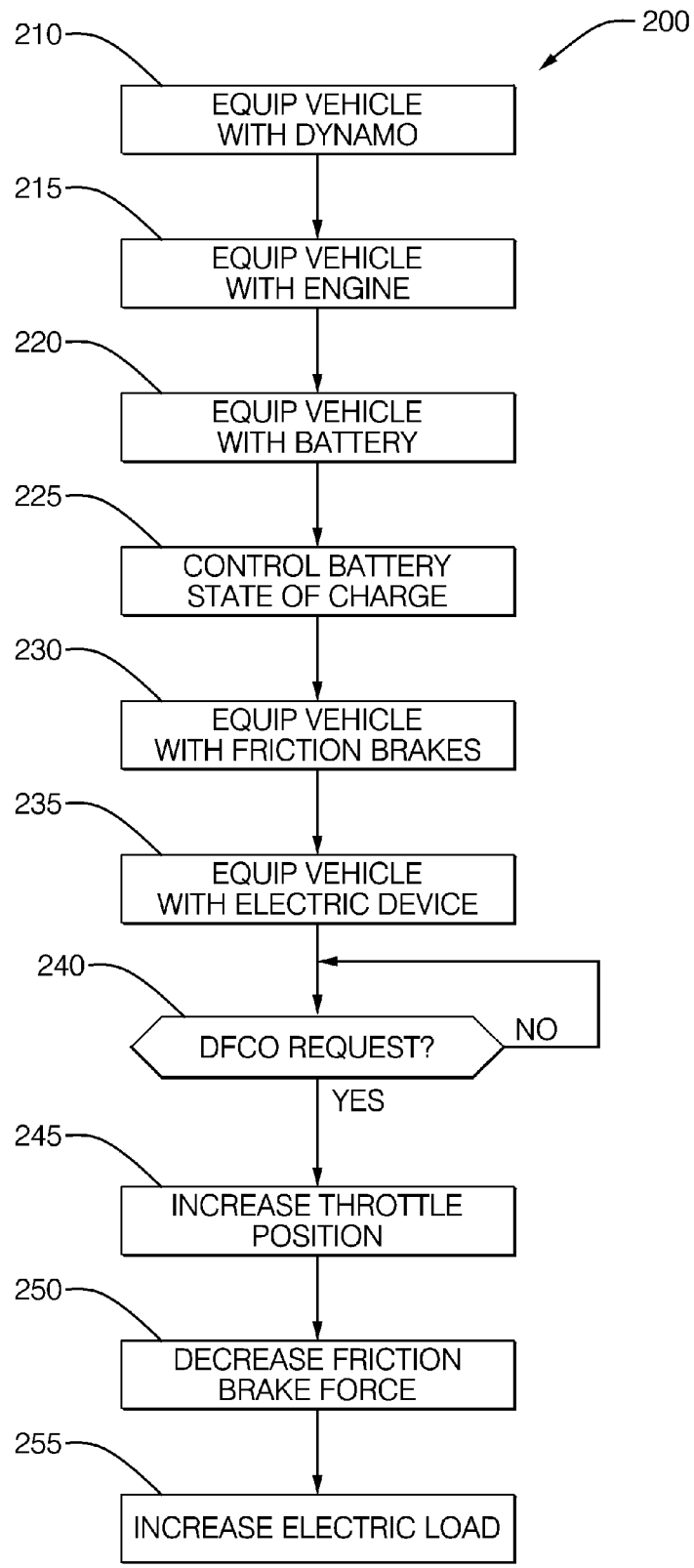
FIG. 2 is a flow chart of a method in accordance with one embodiment.

FIG. 2 illustrates a flow chart of a method 200 for controlling a vehicle deceleration rate of a vehicle 12. At step 210, EQUIP VEHICLE WITH DYNAMO, the vehicle 12 may be equipped with a dynamo 20 configured output electricity in accordance with an electric load on the dynamo 20. The dynamo 20 may also be coupled to the vehicle 12 in a manner effective to provide a dynamo deceleration force 30 to the vehicle 12 corresponding to the electric load.

At step 215, EQUIP VEHICLE WITH ENGINE, the vehicle 12 may be equipped with an internal combustion engine 22. The engine 22 may coupled to the dynamo 20 to rotate the dynamo 20 to output electricity. The engine 22 may also be coupled to the vehicle 12 in a manner effective to provide an engine deceleration force 32 to the vehicle 12 corresponding to a throttle position of a throttle 34 on the engine 22.

At step 220, EQUIP VEHICLE WITH BATTERY, the vehicle 12 may be equipped with a rechargeable battery 28. In general, the rechargeable battery 28 stores electrical energy for starting the engine and propelling the vehicle 12 when the dynamo 20 is operated as a motor. The rechargeable battery 28 also provides a charge reservoir for receiving dumped electricity when the dynamo 22 is operated as a generator, particularly during regenerative braking.

At step 225, CONTROL BATTERY STATE OF CHARGE, the controller 36 may monitor the voltage at the rechargeable battery 28, or keep track of the amount of current flowing into and out of the rechargeable battery 28. Doing so will allow the controller 36 to determine if the rechargeable battery 28 is under-charged, and so can readily receive the electricity generated during regenerative braking, or if the rechargeable battery 28 is fully charged and so the charging voltage may need to be increased above a recommended value for a limited amount of time so the rechargeable battery 28 can act as a dump site for the regenerative braking produced electricity.

At step 230, EQUIP VEHICLE WITH FRICTION BRAKES, the vehicle 12 may be equipped with a typical automotive friction braking system, for example, hydraulic disk or drum brakes. At step 235, EQUIP VEHICLE WITH ELECTRIC DEVICE, may include the vehicle being configured so the controller 36 can activate and deactivate various electronic devices in the vehicle 12 so as to control the electronic load on the dynamo 20.

At step 240, DFCO REQUEST?, the controller 36 may determine if conditions warrant turning off the fuel supply to the engine 22. If NO, then the method 200 loops back and monitors various inputs until some condition arises that constitutes a DFCO request. If YES, then the controller may turn of the fuel supply to the engine 22, and execute a number of steps directed to controlling the deceleration rate of the vehicle and managing the storage and use of electricity in the vehicle so as to increase the overall efficiency of the vehicle control system 10.

At step 245, INCREASE THROTTLE POSITION, the vehicle deceleration rate may be controlled by increasing the throttle position to decrease the engine deceleration force. It is recognized that doing so will decrease the vehicle deceleration rate and if the vehicle deceleration rate is less than desired, for example less than indicated by the brake pedal pressure sensor 54, then other steps may be executed to increase the vehicle deceleration rate.

At step 250, DECREASE FRICTION BRAKE FORCE, is an optional step where the controller 36 may detect a brake pedal position or a brake pedal pressure indicative of a desired deceleration rate 16. If the controller 36 determines that regenerative braking can be used to decelerate the vehicle, then the controller 36 may reduce a friction braking force of a friction brake system, and also increasing the dynamo braking force, to control the vehicle deceleration rate At step 255, INCREASE ELECTRIC LOAD, the controller 36 may take a number of actions to increase the electric load on the dynamo 20 to increase the dynamo deceleration force. One option is to increase a charging voltage output by the dynamo 22. Another option is to maintain the state of charge of rechargeable battery to a state of charge that is less than full by an amount corresponding to the amount of charge produced when the vehicle is decelerated using regenerative braking 14. Then when regenerative braking is desired, the rechargeable battery 28 can receive the energy produced by regenerative braking without over-charging the rechargeable batter 28. Another option is activate an electric device coupled to the dynamo, wherein said electric device is configured to consume electricity.

Accordingly, a vehicle control system 10 for controlling a vehicle deceleration rate, a controller 36 for the vehicle control system 10, and a method 200 of controlling a vehicle deceleration rate of a vehicle 12 are provided. The system 10 is generally configured so that the vehicle 12 can be decelerated by regenerative braking. The system 10 is also generally configured to take actions to maximize the amount of kinetic energy that is converted into electricity by regenerative braking. In particular, the system opens a throttle 24 on the vehicle's internal combustion engine 22, so that kinetic energy is not lost to pumping losses of the engine 22, and thereby wasted. In another instance, the system reduces the braking force of a friction braking system so that less kinetic energy is converted into heat and thereby wasted. The system 10 also has features to manage various aspect of the vehicle's electrical system so that the electricity from dynamo 20 that is generated during regenerative braking is either stored, in a rechargeable battery 28 for example, or consumed in some selected manner by activating selected devices to consume the electricity.

While this invention has been described in terms of the preferred embodiments thereof, it is not intended to be so limited, but rather only to the extent set forth in the claims that follow.

I claim:

1. A vehicle control system for controlling a vehicle deceleration rate, said system comprising:
   a dynamo configured output electricity in accordance with an electric load on the dynamo, said dynamo also coupled to the vehicle in a manner effective to provide a dynamo deceleration force to the vehicle corresponding to the electric load;
   an internal combustion engine coupled to the dynamo to rotate the dynamo and thereby output electricity, said internal combustion engine also coupled to the vehicle in a manner effective to provide an engine deceleration force to the vehicle corresponding to a throttle position;
   a controller coupled to the internal combustion engine, and coupled to the dynamo, said controller configured to determine a deceleration fuel cutoff (DFCO) request based on an accelerator pedal position, and when a DFCO request is determined increase the throttle position to decrease the engine deceleration force, and increase the electric load on the dynamo to increase the dynamo deceleration force, to control the vehicle deceleration rate.

2. The system in accordance with claim 1, wherein the internal combustion engine is also coupled to the vehicle in a manner effective to provide an engine acceleration force to the vehicle.

3. The system in accordance with claim 1, wherein the dynamo is also coupled to the vehicle in a manner effective to provide a dynamo acceleration force to the vehicle.

4. The system in accordance with claim 1, wherein said system further comprises a rechargeable battery, and said electric load on the dynamo is increased by increasing a charging voltage output by the dynamo.

5. The system in accordance with claim 4, wherein said controller is configured to control charging of the rechargeable battery to a state of charge that is less than full by an amount corresponding to the amount of charge produced when the vehicle is decelerated using regenerative braking.

6. The system in accordance with claim 1, wherein said system further comprises an electric device coupled to the dynamo, wherein said electric device is configured to consume electricity when activated, wherein said electric load on the dynamo is increased by activating the electric device.

7. The system in accordance with claim 1, wherein said controller is further configured to detect a brake pedal position indicative of a desired deceleration rate.

8. The system in accordance with claim 7, wherein said system further comprises a friction brake system, and said controller is further configured to reduce a friction braking force of the friction brake system, and increase the dynamo braking force, to control the vehicle deceleration rate.

9. A controller for a vehicle control system configured to control a vehicle deceleration rate, said controller coupled to a dynamo configured to output electricity in accordance with an electric load on the dynamo, said dynamo also coupled to the vehicle in a manner effective to provide a dynamo deceleration force to the vehicle corresponding to the electric load, and said controller also coupled to an internal combustion engine coupled to the dynamo to rotate the dynamo and thereby output electricity, said internal combustion engine also coupled to the vehicle in a manner effective to provide an engine deceleration force to the vehicle corresponding to a throttle position, said controller comprising:
   an accelerator pedal position input for receiving an indication of an accelerator pedal position;
   a processor to determine a deceleration fuel cutoff (DFCO) request based on the accelerator pedal position;
   a throttle control output configured to increase the throttle position to decrease the engine deceleration force when a DFCO request is determined; and
   a dynamo control output configured to increase the electric load on the dynamo to increase the dynamo deceleration force when a DFCO request is determined, and thereby control the vehicle deceleration rate.

10. The controller in accordance with claim 9, wherein said controller is configured to control charging of a rechargeable battery to a state of charge that is less than full by an amount corresponding to the amount of charge produced when the vehicle is decelerated using regenerative braking.

11. A method for controlling a vehicle deceleration rate of a vehicle, said method comprising the steps of:
- equipping the vehicle with a dynamo configured to output electricity in accordance with an electric load on the dynamo, said dynamo also coupled to the vehicle in a manner effective to provide a dynamo deceleration force to the vehicle corresponding to the electric load;
- equipping the vehicle with an internal combustion engine coupled to the dynamo to rotate the dynamo and thereby output electricity, said internal combustion engine also coupled to the vehicle in a manner effective to provide an engine deceleration force to the vehicle corresponding to a throttle position;
- determining a deceleration fuel cutoff (DFCO) request based on an accelerator pedal position; and
- when a DFCO request is determined, controlling the vehicle deceleration rate by increasing the throttle position to decrease the engine deceleration force, and increasing the electric load on the dynamo to increase the dynamo deceleration force.

12. The method in accordance with claim 11, wherein said method includes the steps of equipping the vehicle with a rechargeable battery, and increasing electric load on the dynamo by increasing a charging voltage output by the dynamo.

13. The method in accordance with claim 12, wherein said method includes the step of charging the rechargeable battery to a state of charge that is less than full by an amount corresponding to the amount of charge produced when the vehicle is decelerated using regenerative braking.

14. The method in accordance with claim 11, wherein said method includes the step of activating an electric device coupled to the dynamo, wherein said electric device is configured to consume electricity.

15. The method in accordance with claim 11, wherein said method includes the step of detecting a brake pedal position indicative of a desired deceleration rate.

16. The method in accordance with claim 15, wherein said method includes the step of reducing a friction braking force of a friction brake system, and increasing the dynamo braking force, to control the vehicle deceleration rate.

* * * * *